April 8, 1947.  H. C. RIGGS  2,418,792

STORAGE BATTERY ELECTRIC HEATER

Filed March 24, 1945

INVENTOR
HAROLD COLMAN RIGGS

BY
Augustus B. Stoughton
ATTORNEY

Patented Apr. 8, 1947

2,418,792

UNITED STATES PATENT OFFICE 2,418,792

STORAGE BATTERY ELECTRIC HEATER

Harold Coleman Riggs, Langhorne Manor, Pa., assignor to The Electric Storage Battery Company, a corporation of New Jersey Application March 24, 1945, Serial No. 584,635

5 Claims. (Cl. 136—161)

1

This invention relates to apparatus for controlling the temperature of a storage battery cell.

An object of this invention is to provide simple, inexpensive and efficient means for maintaining a storage battery cell at a satisfactory temperature when subjected to abnormally low ambient temperatures.

A further object is to provide heating means immersed in the electrolyte beneath the plates adapted for installation in a cell container of standard design with but minor and inexpensive modifications which can be made after the standard container has been fabricated.

Another object of this invention is to provide such heating means beneath the plates which will occupy a minimum space and will not afford upwardly facing surfaces of sufficient dimensions to endanger short circuiting the plates by collection of sediment.

Another object of this invention is to provide such heating means comprising an electrical heating device immersed in the electrolyte beneath the plates, adapted for connection to a suitable source of current.

Another object is to provide such an electrical heating device equipped with a thermostatic control responsive to the temperature of the cell.

This invention will be more clearly understood by reference to the following description of one embodiment thereof, in connection with the accompanying drawing in which.

Figure 1:
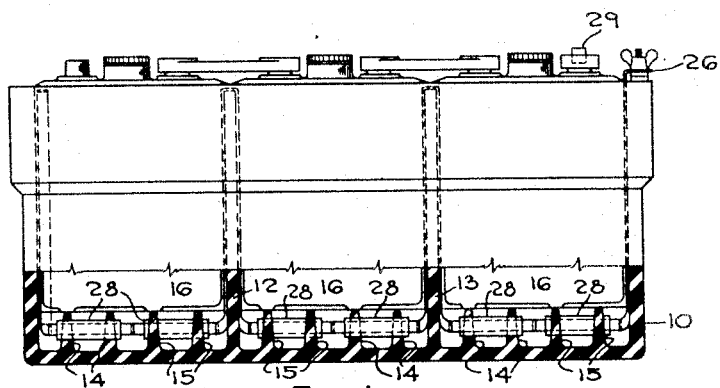
Figure 1 is an elevation partly in section of a six cell storage battery provided with a heating device embodying features of the invention.

In the drawings, 10 represents the container of a six cell storage battery divided into six compartments by the longitudinal partition wall 11 and the transverse partition walls 12 and 13. In the bottom of each compartment are four upstanding ribs 14, 15, for supporting the plate elements 16. In the bottom of each cell is located an electrical heating element, the details of which will now be described in connection with that shown in the lower left hand cell of Figure 3 and in Figure 2, the heating elements in the other cells being substantially the same.

This heating element comprises the horizontal strips of relatively high resistance metal 17, 18

2 and 19 lying longitudinally in the spaces 17a, 18a and 19a between the ribs 14 and 15 and between the ribs and the vertical cell walls. These longitudinal strips are connected by the transverse strips 20 and 21 of similar metal passing through notches 22 and 23 in the ends of the ribs. Any one of the well known high resistance alloys, such as Nichrome, may be used. At the end of strip 17 adjacent the partition wall 11 is provided a riser 24 which is carried over the wall 11 at 24a and brought down on the other side to connect with the heating element in the bottom of the adjacent cell. The riser 24 is preferably made of high conductivity metal such as copper in order to confine the heating effect to the bottom of the cell. This riser may be joined to the high resistance heating strip 17 as by welding along the line 25. The risers from the heating elements at the right-hand end of the battery are brought to suitable terminals 26 and 26a adapted for connection to an external source of current not shown.

It will be understood that the cells are filled with suitable electrolyte, such as dilute sulphuric acid, not shown, and the heating element will be immersed in the electrolyte in the bottoms of the cells. In order to protect the metal of the heating elements from attack by the electrolyte these elements are encased in a coating of acid resistant material 27, such as rubber or synthetic resin.

As shown, the heating elements are in the form of thin flat strips or ribbons arranged with their wide surfaces in vertical planes, thus providing extended surface for the transfer of heat to the surrounding electrolyte and facilitating the circulation of the heated electrolyte upwardly between the plates. The narrow upwardly exposed surfaces of the ribbon afford no opportunity for objectionable collection of sediment. Moreover, such thin ribbons may be located in narrow slots in the ends of the ribs which may be formed during the operation of molding the container or by a suitable tool such as a circular saw after the container has been fabricated.

Where the heating strips or ribbons pass through the slots in the ends of the ribs, the strips are enclosed in U shaped sheaths 28 of heat conducting, acid-resisting material such as lead, whose purpose is to avoid local concentration of heat at these points. If the ribbon were snugly filled into the grooves in ribs of hard rubber or similar heat-insulating material, the heat developed in the ribbon at these points would not be dissipated as it is where the ribbon is immersed in the electrolyte. The lead sheaths carry off this heat and dissipate it into the electrolyte from their surfaces projecting beyond the ribs.

In order to avoid the possibility of developing excessive temperatures in the cells by a prolonged passage of heating current, the contacts of a suitable thermostat may be included between, for example, the terminal 26a and the supply circuit, said thermostat being located to respond to the internal temperature of the cells and designed to open its contacts and interrupt the heating current when the temperature reaches the desired maximum value. It is recognized that the temperature of the intercell connectors of a battery corresponds approximately to that within the cells, and thus in Figure 1 is indicated at 29 a suitable thermostat embedded in the intercell connector, one of whose contacts (not shown) may be connected to the terminal 26a and the other by any suitable means to the external supply circuit.

Figure 2:
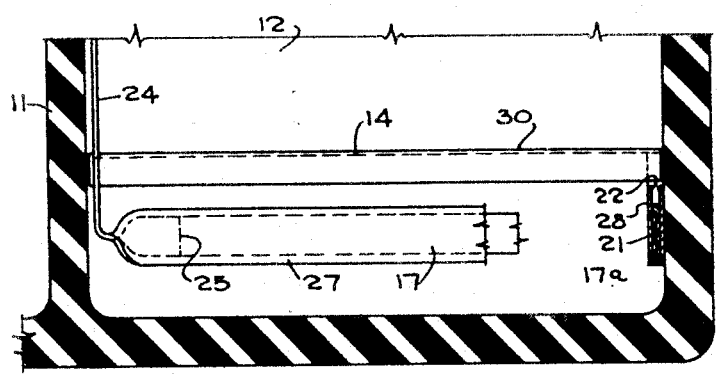
Figure 2 is a sectional elevation to an enlarged scale of the lower portion of one cell on the line 2—2 of Figure 3, with parts of the heater element broken away.
Figure 3:
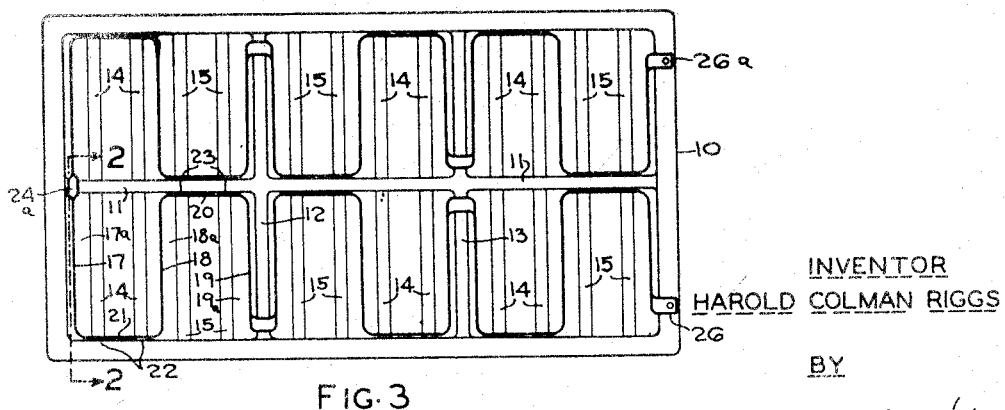
Figure 3 is a plan view of the six cell battery with the cell covers removed showing the heater arrangement of this invention diagrammatically.

In Figure 2 is shown a slight modification in the form of an inverted U shaped saddle 30 of rubber or similar material located along the top of the rib and extending over the notch 22 to provide a support for the outside plate at that point, should this be found necessary or advisable.

From the foregoing it will be seen that there is provided a simple yet effective and inexpensive construction for heating and maintaining the temperature of a storage battery which may be subjected to abnormally low ambient temperatures thereby insuring satisfactory performance of the battery under such circumstances.

While a specific illustration of this invention has been described, modifications thereof will become apparent to those skilled in the art and it is intended by the following claims to cover all such modifications as come within the true spirit and scope of this invention.

I claim:

1. In a temperature-control device for a storage battery cell provided with upstanding plate supporting ribs on the bottom, an electrical heating member comprising horizontally disposed strips in the form of comparatively thin ribbon of resistance metal lying longitudinally in the spaces between the ribs and having transverse connecting portions located in said ribs, the ribbon arranged with its wide faces in vertical planes.

2. In a temperature-control device for a storage battery cell provided with upstanding plate supporting ribs on the bottom, an electrical heating member comprising horizontally disposed strips in the form of comparatively thin ribbon of resistance metal lying longitudinally in the spaces between the ribs and having transverse connecting portions located in slots in said ribs, the ribbon arranged with its wide faces in vertical planes, said heating member provided with vertical terminal connectors of high-conductivity metal adapted for connection to a source of heating current.

3. In a temperature-control device for a storage battery cell provided with upstanding plate supporting ribs on the bottom, an electrical heating member comprising horizontally disposed strips in the form of comparatively thin ribbon of resistance metal lying longitudinally in the spaces between the ribs and having transverse connecting portions located in slots in said ribs, the ribbon arranged with its wide faces in vertical planes, said ribbon provided with thermally conductive sheaths at points where it passes through the slots in the ribs.

4. In a temperature-control device for a storage battery cell provided with plates and upstanding plate supporting ribs on the bottom, an electrical heating member comprising horizontally disposed strips in the form of comparatively thin ribbon of resistance metal lying longitudinally in the spaces between the ribs and having transverse connecting portions located in slots at the ends of the ribs, the ribbon arranged with its wide faces in vertical planes, said ribs provided with inverted U shaped saddles along their upper edges said saddles projecting over the notches for supporting the outside plates.

5. In a temperature-control device for a storage battery comprising a plurality of juxtaposed cells separated by suitable partition walls each cell having upstanding plate supporting ribs on the bottom, the combination of an electrical heating member in each cell said member comprising horizontally disposed strips in the form of comparatively thin ribbon of resistance metal lying horizontally in the spaces between the ribs and having transverse connecting portions located in said ribs, the ribbon arranged with its wide faces in vertical planes, and electrically conducting risers connecting the ends of the heating members in adjacent cells, said risers carried up along and over the top of the adjacent partition wall.

HAROLD COLEMAN RIGGS.

REFERENCES CITED

The following references are of record in the file of this patent:

UNITED STATES PATENTS

| Number | Name | Date |
|---|---|---|
| 1,236,673 | Chamberlain | Aug. 14, 1917 |
| 1,266,780 | Edison | May 21, 1918 |
| 1,797,518 | Boyer | Mar. 24, 1931 |

OTHER REFERENCES

Modern Plastics, February, 1944, page 114.